United States Patent [19]

Kent et al.

[11] 3,736,064

[45] May 29, 1973

[54] HAIR COLOR LEVEL INDICATING METHOD

[76] Inventors: Paula Jane Kent, Maliby; Arthur R. McCullough, Van Nuys, both of Calif. 91401

[73] Assignee: Redkin Laboratories, Inc., Van Nuys, Calif.

[22] Filed: Sept. 17, 1970

[21] Appl. No.: 73,536

[52] U.S. Cl. .................... 356/195, 132/7, 356/209
[51] Int. Cl. ................................................ G01j 3/50
[58] Field of Search .................. 132/7; 356/72, 73, 356/173, 186, 191–195, 209

[56] References Cited

UNITED STATES PATENTS

| | | | |
|---|---|---|---|
| 2,358,020 | 9/1944 | Miller | 356/195 |
| 3,421,821 | 1/1969 | Alessi | 356/209 X |
| 2,817,140 | 12/1957 | Carter et al. | 356/191 X |
| 2,890,094 | 6/1959 | Tucker | 132/7 UX |
| 1,582,122 | 4/1966 | Clapp | 356/73 |
| 2,168,352 | 8/1939 | Lawry | 356/192 X |
| 3,436,156 | 4/1969 | Adler et al. | 356/194 X |
| 3,436,157 | 4/1969 | Adler et al. | 356/192 |

FOREIGN PATENTS OR APPLICATIONS

| | | | |
|---|---|---|---|
| 288,833 | 4/1928 | Great Britain | 356/194 |
| 182,025 | 1/1936 | Switzerland | 356/191 |

*Primary Examiner*—William L. Sikes
*Assistant Examiner*—F. L. Evans
*Attorney*—Christie, Parker & Hale

[57] ABSTRACT

An improved method has been conceived in the art of hair tinting and bleaching, whereby cosmetologist may determine exactly the shade level of a patron's hair for tinting or bleaching purposes. In addition, he can determine exactly the number of shade lifts the hair has undergone during a tinting operation, or the number of stages of bleach the hair has undergone during a bleaching operation. A simple, hand-held instrument is provided which measures the shade level of the patron's hair directly and instantaneously, and which enables the cosmetologist initially to determine the level of color tint to use, and then to determine exactly whether or not the hair has been lifted the desired number of shades. To assist in carrying out the method of the invention, the color tints themselves should be labelled to designate their respective shade levels.

3 Claims, 2 Drawing Figures

PATENTED MAY 29 1973
3,736,064
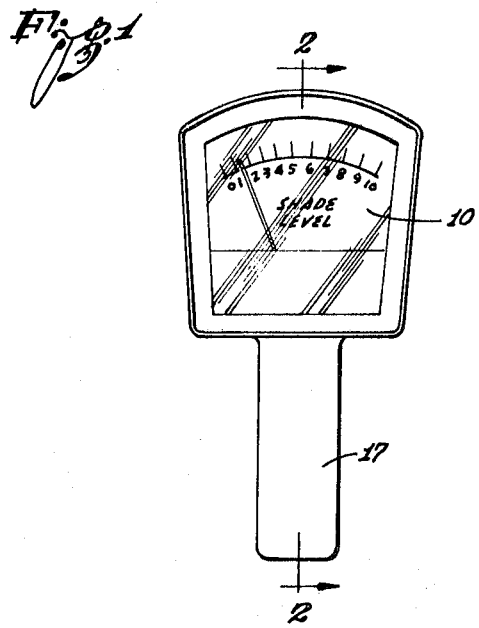
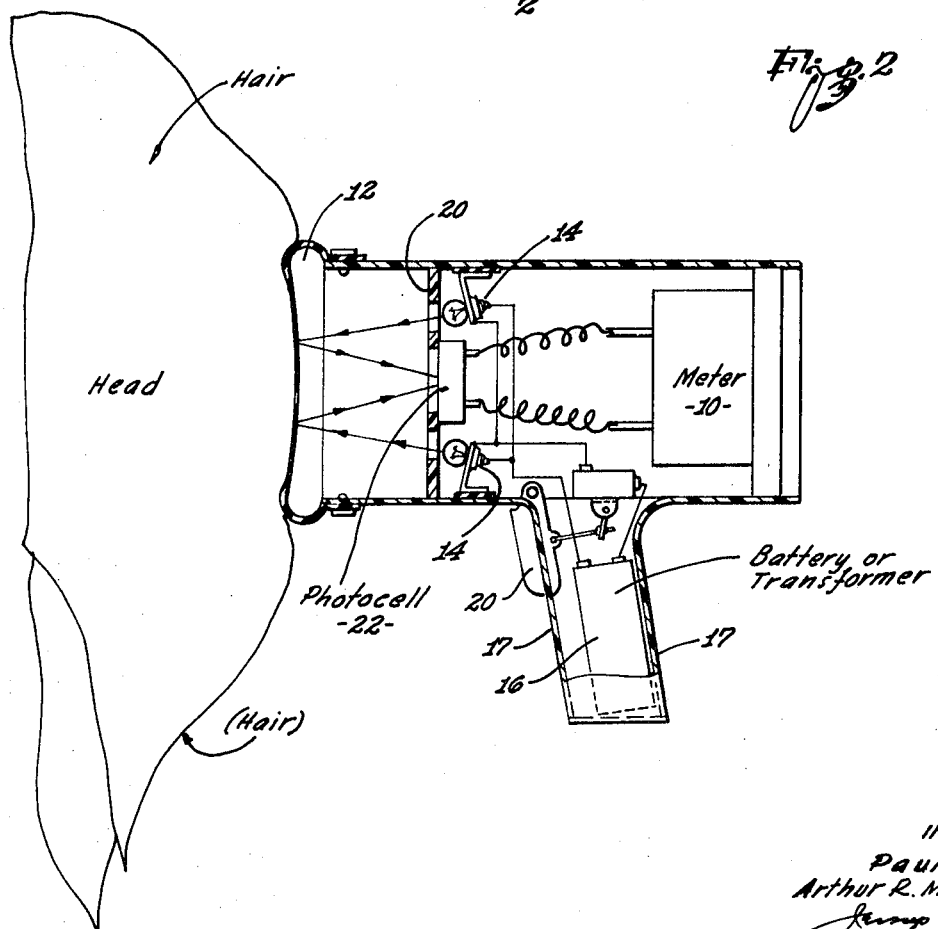
INVENTORS:
Paula J. Kent
Arthur R. McCullough
Jessup and Beecher
By Keith D. Beecher
ATTORNEYS

HAIR COLOR LEVEL INDICATING METHOD

BACKGROUND OF THE INVENTION

One of the major problems in the hair color art is that of "lifting" a patron's hair shade to a desired shade level. Even though a manufacturer may state that its color represents a certain tint, it is difficult for the cosmetologist to determine exactly the proper tint to use for a desired result, and whether the hair of any particular patron has actually been lifted to the desired shade level by the selected tint after the operation has been completed. This is because prior to the advent of the method and instrument of the present invention, the cosmetologist had no way of determining the initial shade level of the patron's hair, or which tint to select to provide a desired shade lift, or whether the desired lift in shade level has been achieved after a particular tint had been applied.

By using an optical spectrophotometer it is possible to measure the shade levels of a product line of hair colors, as applied to selected hair samples. Then, in the practice of the method of the present invention, it is convenient to assess a series of shade levels to the different tints of the product line, these being based on the optical efficiency of the individual tints, and ranging, for example, from 1 to 10.

For example, the shade levels of the various tints may be selected as follows, and covering a range of hair tints extending, for example, from blue-black (the darkest shade) to white-blonde (the lightest shade):

| Shade Level | Optical Efficiency (%) |
|---|---|
| 1 | 8.0–11.6 |
| 2 | 11.6–15.2 |
| 3 | 15.2–18.8 |
| 4 | 18.8–22.4 |
| 5 | 22.4–26.0 |
| 6 | 26.0–29.6 |
| 7 | 29.6–33.2 |
| 8 | 33.2–36.8 |
| 9 | 36.8–40.4 |
| 10 | 40.4–44.0 |

Each level, as noted, incorporates a range of optical efficiencies to allow for variations in color absorption between one patron and another.

In the practice of the present invention, the cosmetologist first uses an instrument constructed in accordance with the invention to determine the shade level of the hair of the patron to which a tint or bleach is to be applied. Then a tint is selected having a designated shade level which will provide the shade lift desired in the particular instance. In this respect it is noted that when the patron's hair has a shade level of 4 or under, for example, no successful shade lift can be expected by the application of tint alone, and the hair must first undergo a predetermined number of bleaching stages. Moreover, if the tint is of the shade level of 5 or under, no successful lift on any shade of hair can be expected because it is necessary to deposit more color into the hair than the tint will be lifting. However, on hair with a shade level of over 4 and with a tint of a shade level of over 5, by subtracting the shade level of the hair from the shade level of the tint, the result provides the cosmetologist with the shade lift he can expect in any particular case.

As mentioned, the method of the present invention applies equally to the stages of bleach by which the shade levels in the aforesaid table may be achieved. For example, prior to changing the natural color pigment of the patron's hair to a different shade coloring, the shade level indicated by the instrument of the invention may indicate that a pre-bleach action is required. During the bleaching process, the instrument and table may be used in exactly the same manner to designate the actual shade level achieved during the bleaching operation, so that the desired stages of bleach are exactly indicated to the cosmetologist.

BRIEF DESCRIPTION OF THE DRAWING

FIG. 1 is a rear view of a portable instrument constructed to incorporate the concepts of the invention; and FIG. 2 is a side section of the instrument held against the head of a patron, and indicating the internal components of the instrument, the view of FIG. 2 being taken along the line 2—2 of FIG. 1.

DETAILED DESCRIPTION OF THE ILLUSTRATED EMBODIMENT

The instrument illustrated in FIGS. 1 and 2 comprises a reflectometer which measures the optical efficiency of the hair of a patron by directing white light against the hair, and by then measuring the reflected light. The instrument includes a meter 10 whose scale is observable from the rear end of the instrument, and which may be calibrated directly in shade levels in accordance with the table set forth previously herein.

The instrument has a forward section 12 which is contoured to be held against the hair of the patron, and it includes a source of white light which may take the form, for example, of a plurality of incandescent light bulbs, such as the bulbs 14. The bulbs 14 are positioned in appropriate sockets (not shown), and they are energized by a battery or transformer 16 which may conveniently be mounted in the handle 17 of the instrument. When a battery is used, for example, the instrument is entirely a self-contained unit. However, it may be convenient to provide a cord so that the instrument may be plugged into a usual alternating current wall receptacle, in which case a transformer is included in the handle, for example, to reduce the voltage to an acceptable level for the lamps 14. In a constructed embodiment, four lamps 14 are used, each having a power level of 0.6 watts. The lamps 14 are energized when a switch 18 is closed, the switch being controlled, for example, by means of a trigger 20 adjacent the front edge of the handle section 17.

The lamps 14 direct their light through an appropriate apertured plate 20 mounted between the lamps at the forward end 12 of the instrument, and the reflected light from the patron's hair is directed back through the plate 20 to a photocell 22. The photocell 22 serves to transform the reflected light into corresponding electric energy, and it may, for example, may be a usual type of selenium cell. The resulting electric signal from the photocell 22 is introduced to the meter 10, which is of the galvanometer type, so that the meter may be deflected an appropriate amount on the calibrated shade level scale of FIG. 1.

Since the light source designated by the lamps 14 is a white light, it contains the three primary colors in even proportions. The instrument of FIGS. 1 and 2 then measures the total reflectance of the light from the individual head of hair and provides a reading, as mentioned above, based on the exact percentage of reflectance. That is, the reading provided by the meter 10 is directly indicative of the optical efficiency of the patron's hair shade level. This means that the instrument, as mentioned above, may be calibrated directly in shade levels in accordance with the aforesaid table, so that the cosmetologist can determine at any time during a hair tinting or hair bleaching operation the actual shade level of the patron's hair.

The method and instrument of the present invention provides, therefore, a simple and efficient means to enable a cosmetologist to determine exactly the initial shade level of a patron's hair, and then to decide without guesswork, exactly the number of bleaching stages necessary and/or the exact number of color lift stages necessary to achieve a desired shade level. The instrument of the invention also serves to inform the cosmetologist during the hair tinting or hair bleaching operation whether or not the desired shade levels have been reached. This makes it possible for the desired results to be achieved accurately and on a scientific basis.

It will be appreciated that although a particular embodiment of the method and instrument of the invention has been described, modifications may be made. It is intended to cover all such modifications in the following claims.

What is claimed is:

1. A method of tinting hair to a lighter shade comprising the steps of:

directing a beam of white light onto the hair while excluding ambient light from the area on which the beam of light falls, measuring the intensity of light reflected by hair exposed to said beam, converting the measured level of light to a numbered scale where one end of the scale corresponds to the level of light reflected from black hair and the other end of the scale corresponds to the level of light reflected from white hair, providing a group of hair tints of different shades from blue-black to white-blond and numbered on the same scale as the numbered light scale, and applying a tint higher on the scale than the measured light level only when the measured light level is above a predetermined number on the scale.

2. The method of claim 1 further comprising the step of: applying bleach to the hair before applying the tint when the measured light level is below said predetermined level.

3. The method of claim 1 wherein said predetermined level is approximately at the mid-point of the scale.

* * * * *